(12) United States Patent
Burrows et al.

(10) Patent No.: US 6,606,399 B2
(45) Date of Patent: *Aug. 12, 2003

(54) PTF TOUCH-ENABLED IMAGE GENERATOR

(75) Inventors: Kenneth Burrows, Pilot Point, TX (US); Stuart J. Ford, Spring, TX (US)

(73) Assignee: MRM Acquisitions, LLC, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/924,436

(22) Filed: Aug. 8, 2001

(65) Prior Publication Data

US 2001/0055412 A1 Dec. 27, 2001

Related U.S. Application Data

(63) Continuation of application No. 09/511,929, filed on Feb. 23, 2000, which is a continuation of application No. 09/093,549, filed on Jun. 8, 1998, now Pat. No. 6,091,838.

(51) Int. Cl.$^7$ .................................................. G06K 9/00
(52) U.S. Cl. ....................... 382/124; 382/115; 382/121; 313/509; 315/246
(58) Field of Search ............................... 382/124, 121, 382/122, 127; 315/169.3, 246, 381; 313/512, 506, 503, 509, 317, 498, 504, 511

(56) References Cited

U.S. PATENT DOCUMENTS

| | | | |
|---|---|---|---|
| 3,663,194 A | 5/1972 | Greenstein et al. | 250/214 LS |
| 3,875,449 A | 4/1975 | Byler et al. | 313/466 |
| 4,297,619 A | 10/1981 | Kiteley | 315/381 |
| 4,548,646 A | 10/1985 | Mosser et al. | 106/14.12 |
| 4,684,353 A | 8/1987 | deSouza | 445/51 |
| 4,720,432 A | 1/1988 | Vanslyke et al. | 428/457 |
| 4,816,717 A | 3/1989 | Harper et al. | 313/502 |
| 4,853,079 A | 8/1989 | Simopoulos et al. | 313/509 |
| 4,853,594 A | 8/1989 | Thomas | 313/503 |
| 4,999,936 A | 3/1991 | Calamia et al. | 40/554 |
| 5,077,803 A | 12/1991 | Kato et al. | 382/124 |
| 5,079,483 A | 1/1992 | Sato | 315/169.3 |

(List continued on next page.)

FOREIGN PATENT DOCUMENTS

| | | |
|---|---|---|
| JP | 63-160622 | 1/1990 |
| JP | 244702 | 10/1995 |

OTHER PUBLICATIONS

International Publication No. WO97/16834, international publication date of May 9, 1997, international filing date: Oct. 24, 1996; Edward S. Gaffney, "Piezoluminescent Sensor Sheet With A Piezoresistive Layer.".

(List continued on next page.)

*Primary Examiner*—Bhavesh M. Mehta
*Assistant Examiner*—Sheela Chawan
(74) *Attorney, Agent, or Firm*—Locke Liddell & Sapp LLP

(57) ABSTRACT

A polymer thick film (PTF) electroluminescent device generating images described by contact, in which the contact itself closes an open circuit to generate radiation in a pattern in register with the contact. The resulting irradiated image corresponds directly to the contact pattern energizing the radiation. In a preferred embodiment enabled by an electroluminescent system without a back electrode, a fingerprint is disposed to close the open circuit by making contact and thereby serving as a "temporary" back electrode. The electroluminescent then energizes in a pattern in register with the contact (i.e. the fingerprint) to emit a high-resolution image of visible light with high fidelity to the contact. This visible light image may then be directed on to a photosensitive array standard in the art suitable for pixelation and conversion into an electrical signal representative of the image. This signal is available for computerized storage, analysis, processing and comparison.

20 Claims, 3 Drawing Sheets

U.S. PATENT DOCUMENTS

| | | | |
|---|---|---|---|
| 5,243,060 A | 9/1993 | Barton et al. | 556/435 |
| 5,398,275 A | 3/1995 | Catalin | 378/98.8 |
| 5,420,936 A | 5/1995 | Fitzpatrick et al. | 382/124 |
| 5,426,708 A | 6/1995 | Hamada et al. | 382/125 |
| 5,446,290 A | 8/1995 | Fujieda et al. | 250/556 |
| 5,467,403 A | 11/1995 | Fishbine et al. | 382/116 |
| 5,491,377 A | 2/1996 | Janusaukas | 313/506 |
| 5,493,621 A | 2/1996 | Matsumura | 382/125 |
| 5,496,427 A | 3/1996 | Gustafson et al. | 156/67 |
| 5,526,436 A | 6/1996 | Sekiya | 382/115 |
| 5,546,462 A | 8/1996 | Indeck et al. | 380/23 |
| 5,548,394 A | 8/1996 | Giles et al. | 356/71 |
| 5,598,485 A | 1/1997 | Kobayashi et al. | 382/278 |
| 5,613,014 A | 3/1997 | Eshera et al. | 382/124 |
| 5,623,552 A | 4/1997 | Lane | 382/124 |
| 5,623,553 A | 4/1997 | Sekiya | 382/127 |
| 5,629,764 A | 5/1997 | Bahuguna et al. | 356/71 |
| 5,633,947 A | 5/1997 | Sibbald | 382/124 |
| 5,635,723 A | 6/1997 | Fujieda et al. | 250/556 |
| 5,680,205 A | 10/1997 | Borza | 356/71 |
| 5,732,148 A | 3/1998 | Keagy et al. | 382/124 |
| 5,781,651 A | 7/1998 | Hsiao et al. | 382/127 |
| 5,864,296 A | 1/1999 | Upton | 340/825.3 |
| 6,091,838 A * | 7/2000 | Burrows et al. | 382/124 |

OTHER PUBLICATIONS

International Publication No. WO97/29477, international publication date of Aug. 14, 1997, international filing date: Feb. 12, 1997; John Scott, "An Input Device For Controlling A Pointer On The Screen Of A Computer.".

International Publication No. WO97/36544, international publication date of Oct. 9, 1997, international filing date: Mar. 26, 1997; Maryline Calmel, "Fingerprinting Device.".

International Publication No. WO 97/46053, filed May 29, 1997 and published Dec. 4, 1997; Kenneth Burrows, "Electroluminescent System in Monolithic Structure.".

International Publication No. WO 98/30069, filed Dec. 22, 1997 and published Jul. 9, 1998; Kenneth Burrows, "Elastomeric Electroluminescent Lamp.".

Internation Publication No. WO99/00761, international publication date of Jan. 7, 1999, international filing date: Jun. 18, 1998; Jon E. LaFreniere, "Electroluminescent Fingerprint Apparatus And Method.".

International Publication No. WO99/12472, international publication date of Mar. 18, 1999, international filing date: Aug. 31, 1998; Paul F. Vachris, "Relief Object Image Generator.".

International Publication No. WO99/27485, international publication date of Jun. 3, 1999, international filing date: Nov. 25, 1998; Alexander Dickinson, et al., "Method And System For Computer Access And Cursor Control Using A Relief Object Image Generator.".

International Search Report for PCT/US99/12765 mailed out Sep. 2, 1999, based on priority U.S. application 09/093,549 filed Jun. 8, 1998.

PCT Written Opinion dated May 26, 1998—International application No. PCT/IS97/09112.

Samsung Chemical Company, "Sam Sung Co's Technology Service About Screen Printing", downloaded Mar. 16, 1998 from the Internet at http://www.sgiakor.org.inf.htm.

Database WPI, Section Ch, Week 8320; Derwent Publications Ltd., London, U.K.; AN83–48904K; XP002080114 and SU942 684 B (As AZERB Physics); Jul. 15, 1982—abstract.

Database WPI, Section Ch, Week 8141; Derwent Publications Ltd., London, U.K.; AN81–75251D; XP002080115 and SU797 657 B (As Azerb Physics); Jan. 28, 1981—abstract.

Patent Abstracts of Japan, vol. 014, No. 352 (P–1085), Jul. 30, 1990; also JP 02 126381A (NEC Kansai Ltd), May 15, 1990—abstract.

Internet—Veridicom Technology Overview; located at website: www.veridicom.com/techoverview.htm.

Internet—Veridicom How It Works; located at website: www.veridicom.com/howitworks.htm.

Magazine Article—*Appliance Manufacturer*, Mar. 1998, p. 60–61: The Right Touch.

Magazine Article—*Appliance Manufacturer*, Nov. 1998, p. 30: New Light on Membrane Switches.

* cited by examiner

PTF TOUCH-ENABLED IMAGE GENERATOR

RELATED APPLICATIONS this application is a continuation of, commonly assigned U.S. Pat. application TOUCH-ENABLED IMAGE GENERATOR, Ser. No. 09/511,929, filed Feb. 23, 2000, which is a continuation of commonly assigned U.S. patent application IRRADIATED IMAGES DESCRIBED BY ELECTRICAL CONTACT, Ser. No. 09/093,549, filed Jun. 8, 1998, now U.S. Pat. No. 6,091,838, issued Jul. 18, 2000.

This application is also related to commonly assigned U.S. Pat. No. 5,856,029, issued Jan. 5, 1999, entitled ELECTROLUMINSCENT SYSTEM IN MONOLITHIC STRUCTURE, the disclosure of which patent is incorporated herein by reference.

TECHNICAL FIELD OF THE INVENTION this invention relates generally to devices generating images of contact (such as fingerprints), and more specifically to a device that causes a pattern of contact itself to selectively close an open circuit, where such closure of the circuit energizes an irradiated image directly in register with the contact pattern.

BACKGROUND OF THE INVENTION

Devices are known in the art to capture images described by contact on a surface. A primary, although by no means exclusive, application for such imaging devices is in the area of fingerprinting, whether for security, forensics or other purposes. Other applications include analysis of surface texture for classification or testing purposes, or recording contact for archival purposes, or possibly mechanical duplication.

All of the foregoing applications involve translating the image described by contact into a reproducible record of the image. For example, in the fingerprint application, a time-honored system is to "ink" the fingers and roll them on a paper or card surface. Of course, without further scanning of the results, such systems lack the capability to generate computer-ready signals representative of the images. Without the storage and analysis capabilities of a computer, cataloging and comparison of such fingerprint images is a time-consuming and unpredictable task.

More recent devices shine light onto the fingerprint via a prism. The reflected image may be captured on photosensitive film, or received onto a photosensitive array. In the latter case, the image may then be pixelated and stored as an analog or digital signal representative of the image. These signals are now available for further processing by computers.

The prior art references cited with this disclosure demonstrate that fingerprinting is a popular application of the "reflected image" technique. The same "reflected image" technique is also known to be used to scan paper or other textile images into scanners and photocopiers.

The disadvantage with all devices employing a "reflected image" technique of recording images is that by definition they need an independent light source and optical structure (such as a prism) to create a reflected image. The same is true of "reflected image" techniques using radiation outside of the visible light band of the electromagnetic spectrum. By definition, an independent radiation source and reflective/diffractive structure is still required.

Other current art devices generating images by contact use proximity sensors to detect changes in characteristics such as capacitance or magnetic flux. The disadvantages of these devices are that (1) they can be unreliable, and (2) they can be costly. They are unreliable inasmuch that in detecting variations in, say, capacitance, there is no way to know whether capacitance change is caused by contact or by some other stray source. Further, an expense must be incurred in such devices in creating sensor circuitry having fidelity and resolution comparable to the capability of capturing and resolving reflected radiation such as visible light.

There is therefore a need in the art for a device generating images described by contact, where the contact is the primary source of energy for the image itself. In this way, the extra structure required in "reflected image" techniques would be obviated. Further, it would be highly advantageous if such an inventive device did not rely on proximity sensors to detect the contact. The inventive device would then have increased predictability in performance, without requiring complex sensor circuitry to interpret the contact.

SUMMARY OF THE INVENTION

These and other objects, features and technical advantages are achieved by an invention that generates images described by contact, in which the contact itself closes an open circuit to generate radiation in a pattern in register with the contact. In this way, an irradiated image results, which corresponds directly to the contact pattern energizing the radiation.

The invention thus has immediate (although not exclusive) application to fingerprinting techniques. In a preferred embodiment enabled by an electroluminescent system without a back electrode, a fingerprint is disposed to close the open circuit by making contact and thereby serving as a "temporary" back electrode. The electroluminescent system then energizes in a pattern in register with the contact (i.e. the fingerprint) to emit a high-resolution image of visible light with high fidelity to the contact. This image may then be directed on to a photosensitive array standard in the art suitable for pixelation and conversion into an electrical signal representative of the image. This signal is available for computerized storage, analysis, processing and comparison.

Advantageously, the electroluminescent system enabling a preferred embodiment is a low cost, screen-printed polymer thick film ("PTF") lamp, which may be electrically powered at a low AC voltage (say 20–30 volts AC) at frequencies in a range of 400 Hz to 2 kHz. Such a power supply is well known in the art to be available from low voltage integrated circuit inverters (say 3–5 volts DC). The electroluminescent system will then be very safe to the touch by virtue of the very low current levels generated by such an electrical system.

Of course, it will be appreciated that the invention is in no way limited to fingerprinting applications. According to the invention, any form of electrically conductive contact will describe an irradiated image. Thus, the surface textures of many objects, animate or inanimate, may be imaged with the invention.

Further, the invention is not limited to contact generating visible light via electroluminescence. Although the preferred embodiment as described is highly advantageous, the invention in its broadest form encompasses generating irradiated imaged described by contact, where the contact itself closes an open circuit to energize radiation in register with the contact. Thus, generation of any radiation in the electromagnetic spectrum falls within the scope of the invention. For example, an infrared image could be generated by an open circuit where heat is emitted in pattern in register with selective closure of the circuit by the contact. Clearly, yet further fidelity and resolution of images described by contact may be available through selection of the wavelength of the radiation generated by the invention, as may be compatible with the device receiving and interpreting the irradiated image.

Similarly, the use of electroluminescence in the preferred embodiment should not be considered as limiting. Clearly, using the contact to form the back electrode of an electroluminescent lamp is a highly advantageous enablement of radiation in register with contact. The invention, however, is broad in concept in that it uses the contact itself to close an open circuit to energize radiation in register with the contact. Thus, it will be appreciated that the invention is enabled by any open circuit capable of generating radiation in register with selective closure of the circuit by a pattern of contact.

It is therefore a technical advantage of the present invention to generate an irradiated image corresponding to contact, by causing the contact to close an open circuit, thereby obviating the need for additional apparatus such as an independent radiation source and reflective/diffractive structure to enable a "reflected image."

It is a further technical advantage of the invention to eliminate the unpredictability and potential manufacturing complexity of devices using "proximity sensor" structure to generate an image of contact.

A yet further technical advantage of the invention is that it can be enabled reliably and economically on a screen-printed PTF electroluminescent lamp, where the contact forms the back electrode of the lamp. Visible light in a pattern in register with the contact may then be radiated towards a photosensitive array. This array in turn may pixelate the image and prepare a computer-ready signal corresponding to the image.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
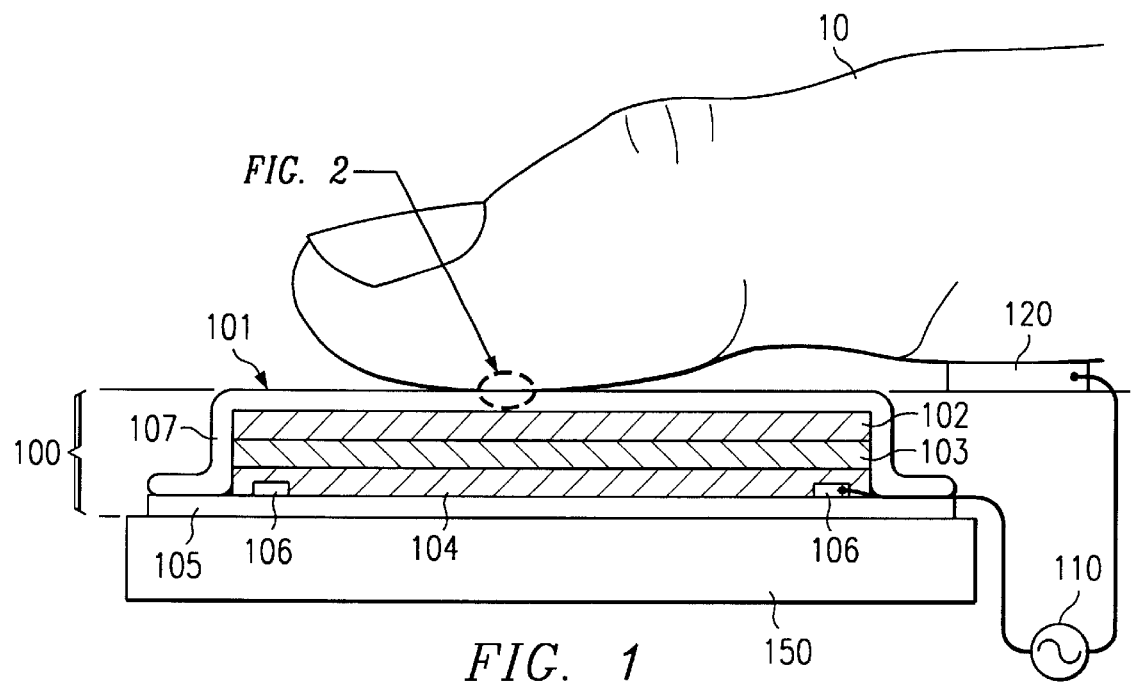
FIG. 1 is a section view through a preferred embodiment of the present invention.

As described summarily above, by the present invention is directed to an apparatus capable of emitting radiation corresponding to zones of contact on a surface, where the contact physically closes an open electrical circuit, and where the closure of the circuit energizes the radiation in a pattern in register with the contact to a high degree of fidelity and resolution. This apparatus is particularly advantageous in generating fingerprint, palm print, footprint or other skin images where the skin is electrically conductive. A preferred embodiment will be discussed with reference to generating a visible light image of a human thumb print, although as already discussed, the invention is not limited in this regard. Skin images of other anatomical regions of humans, as well as other life forms, may be generated by the invention, so long as the skin whose contact is described by the image is electrically conductive. Further, the invention is not limited to generating images of anatomical contact. It will be appreciated that the other embodiments of the invention may generate irradiated images described by contact on a contact surface by any electrically conductive zone wherein a previously open circuit is now closed by the contact. Accordingly, images corresponding to, for example, metal surface textures, or "water marks" on electrically conductive fabrics, textiles or papers may be generated by the invention with equivalent enabling effect.

The preferred embodiment will further be discussed with reference to generating visible light using an open electroluminescent system closed by contact by a thumb print on a contact surface. It will nonetheless be further appreciated, however, that the invention is not limited in this regard. Consistent with the invention, the area of contact may be described by radiation anywhere in the electromagnetic spectrum, and not just in the visible light band as enabled by the preferred embodiment discussed below. Imagery in, for example, the infra-red, ultra-violet bands is consistent with the invention where irradiated images of such emissions have useful applications.

Likewise, the use of an open electroluminescent circuit in a preferred embodiment should not be considered as limiting under the invention. Electroluminescence has useful applications in the visible light band because an open circuit can be deployed easily and economically in the form of a laminate, where the contact to be imaged can form a back electrode, thereby closing the circuit and generating light in register with the contact. It will be appreciated, however, that other forms of circuitry will be consistent with the invention where contact closes an open circuit to generate corresponding irradiated images outside of the visible light band. For example, consistent with the invention, heat could be generated in register with the passage of current through a circuit closed by contact. Accordingly, circuitry generating infra-red radiation in register with circuit-closing contact will be enabled by the invention. Thus, by selecting various radiation-generating components in the open circuit to be closed by contact, other types of circuits will enable the invention.

Turning now to FIG. 1, a general arrangement of the preferred embodiment includes human thumb 10 making thumb print contact on a contact surface 101 on electroluminescent system 100. Thumb 10 also concurrently makes electrical contact with contact plate 120, contact plate 120 being isolated electrically from electroluminescent system 100.

With further reference to FIG. 1, electroluminescent system 100 comprises substrate 105 on which translucent electrode layer 104 is deposited. In a preferred embodiment, substrate 105 may be any suitable material allowing the passage of visible light, such as polyester, polycarbonate, vinyl or elastomer.

In a preferred embodiment, the active ingredient doped into translucent electrode layer 104 is Indium-Tin-Oxide ("ITO"), although any other functionally equivalent transparent metal oxide dopant known in the art may be used, such as, for example, Tantalum-Oxide. In another embodiment (not illustrated) substrate 105 and translucent layer 104 may be combined using a pre-sputtered ITO polyester sheet. Translucent electrode layer 104 also includes bus bar 106 connected to power source 110. Although shown in section on FIG. 1, it will be appreciated that bus bar 106 is continuous within translucent electrode layer 104 so as to energize the planar area of the layer. In a preferred embodiment, bus bar 106 is screen printed on to a substrate 105, using a silver polymer thick film (PTF) ink, prior to screen printing of translucent electrode layer on to substrate 105. It will be appreciated, however, that bus bar 106 is not limited in this way, and may also be, for example, a thin copper strip adhered to substrate 105 prior to depositing translucent electrode layer 104. Of course, if pre-sputtered ITO polyester sheet is used to combine substrate 105 and translucent electrode layer 104 (not illustrated), then bus bar 106 may be eliminated.

Continuing to refer to FIG. 1, contact surface 101 is on top of envelope layer 107. Envelope layer is an electrically conductive layer protecting electroluminescent system 100. Advantageously, envelope layer 107 is a hard wearing material so as to give contact surface 101 a long life. Examples of materials suitable for envelope layer 107 when the invention is practiced in accordance with screen printing techniques as described further below are epoxies, polyurethanes, acrylics and other similar hard wearing materials.

Envelope layer 107 and translucent electrode layer 104 are separated by dielectric layer 102 and luminescent layer 103. In a preferred embodiment, the layer sequence is as shown in FIG. 1, where luminescent layer 103 is closer to substrate 105 than dielectric layer 102. The invention would still be enabling if luminescent layer 103 and dielectric layer 102 were reversed. Light irradiated from luminescent layer 103 would then have to pass through dielectric layer 102 to reach substrate 105, however, possibly with disadvantageous effects such as energy loss, diffusion or diffraction. Accordingly, a preferred embodiment arranges the layers as shown in FIG. 1.

In a preferred embodiment, the active ingredient in dielectric layer 102 is Barium-Titanate and in luminescent layer 103 is encapsulated Phosphor. Inks doped with these ingredients are screen printed down on top of each other before envelope layer 107 is screen printed down to seal the system. Note that for optimum results, luminescent layer 103 should be deposited extremely evenly to generate a constant and predictable light emission by contact at any point on contact surface 101.

Figure 1A:
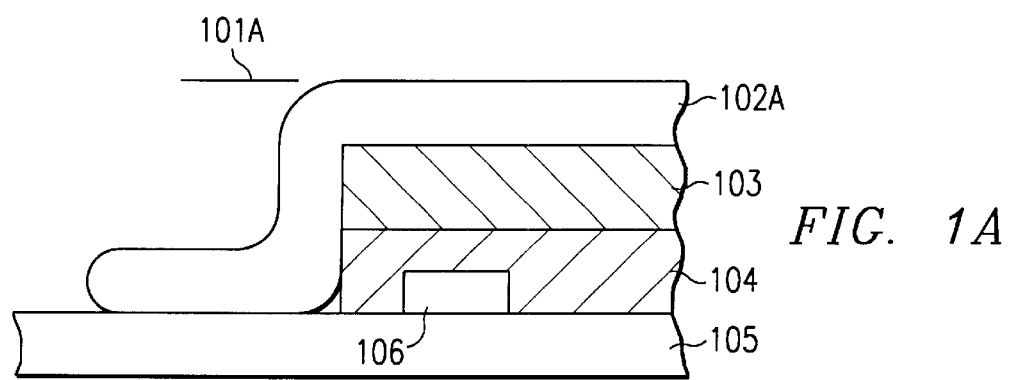
FIG. 1A is a section view through an alternative embodiment of the present invention.

FIG. 1A depicts an alternative embodiment in which envelope layer 107 on FIG. 1 is omitted, its function replaced by a hard wearing dielectric layer 102A. In FIG. 1A, therefore, contact surface 101A is on dielectric layer 102A. Dielectric layer 102A on FIG. 1A is advantageously comprised of Barium-Titanate doped into a screen printed layer of epoxy, the epoxy selected as the binder for hard-wearing and environmental-resisting life. The advantage of the embodiment according to FIG. 1A, of course, is that it has less components and so is therefore more economical to manufacture. The disadvantage compared to the embodiment of FIG. 1, however, is that as dielectric layer 102A wears from use, the layer itself deteriorates. Ultimately, as wear continues, this may directly affect the luminescent fidelity of the inventive apparatus in describing contact on contact surface 101A. To prepare and prolong the life of the system depicted on FIG. 1A, therefore, additional catalytic cross-linking of the system is highly advantageous, using chemical or ultra-violet treatment techniques known in the art.

Returning now to FIG. 1, it will be seen that electroluminescent system 100 is incomplete inasmuch that it lacks a back electrode. Further, when power source 110 is coupled between bus bar 106 and contact plate 120 as shown in FIG. 1, an open circuit results, stretching from contact surface 101, through electroluminescent system 100, and round to contact plate 120 via power source 110.

According to the present invention, and as shown on FIG. 1, thumb 10 completes the open circuit, by concurrently touching contact plate 120 and making thumb print contact with contact surface 101. It will be appreciated that contact plate 120 is but one choice of enabling electrical contact with thumb 10, and other methods (such as a wire attached by an electrode) would have an equivalent enabling effect.

Figure 2:
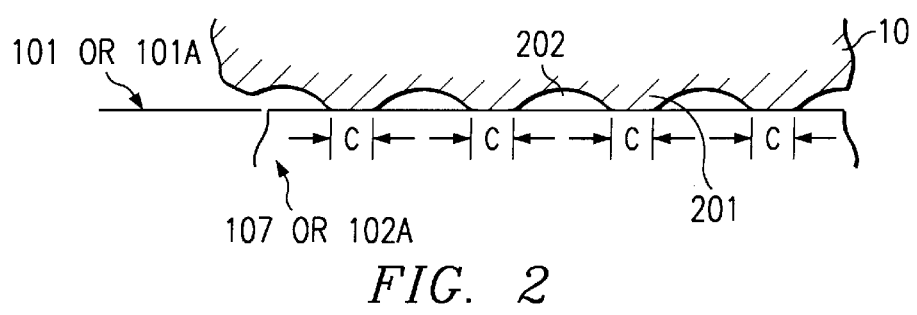
FIG. 2 is an enlargement of contact as shown on FIGS. 1A and 1B.

Of particular inventive significance, however, is that thumb 10 makes thumb print contact with contact surface 101. As enlarged on FIG. 2, thumb 10 makes selective zones of contact C in a pattern described by ridges 201 touching contact surface 101, while valleys 202 remain clear. The open circuit described above with respect to FIG. 1 is thus selectively closed in a pattern in register with zones of contact C. This circuit in turn causes electroluminescent system 100 to energize in a pattern in register with zones of contact C, so that luminescent layer irradiates a visible light image with high fidelity and resolution to zones of contact C. In the embodiment of the invention shown on FIG. 1, this irradiated image is projected downwards through substrate 105.

FIG. 1 also shows photosensitive array 150 immediately below substrate 105. Photosensitive array 150 may then pixelate the irradiated image described by zones of contact C on FIG. 2 into electrical signals representative of the image. These signals may be processed further according to the application for the inventive apparatus.

Referring back to discussion at the beginning of this section, therefore, it will be seen that thumb 10 on FIG. 1 may be substituted for other electrically conductive structures whose surface texture can be described by an irradiated image via contact with contact surface 101. Moreover, although FIG. 1 has described an electroluminescent system generating a visible light image describing zones of contact C on the contact surface 101, a broader aspect of the invention is that irradiated images are generated by selectively completing an open electric circuit in register with the contact. Thus, as described earlier, other forms of radiation generated via selective closure of other types of open circuit fall within the scope of the invention.

Figure 3:
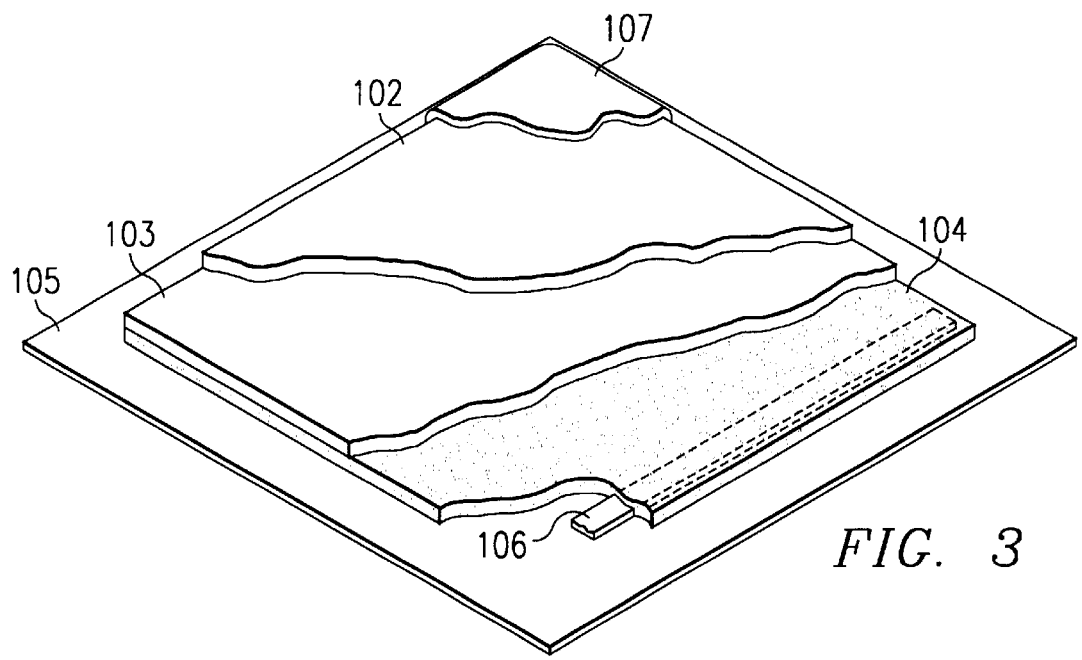
FIG. 3 is a cutaway view of the embodiment of the invention illustrated on FIG. 1.

FIG. 3 illustrates the invention in cutaway view. As suggested earlier, a preferred embodiment of the invention deploys electroluminescent system 100 (as shown on FIG. 1) by successively screen printing layers according to the described laminate. Advantageously, screen printing techniques such as described and enabled in great detail in commonly assigned U.S. Pat. No. 5,856,029, issued Jan. 5, 1999, entitled "ELECTROLUMINESCENT SYSTEM IN MONOLITHIC STRUCTURE", the disclosure of which application is fully incorporated herein by reference, will be used to enable the present invention. Specifically, materials, quantities and techniques disclosed in the above-referenced co-pending application using a vinyl resin carrier in gel form will enable a hard-wearing electroluminescent laminate suitable for the thumb print application described herein.

Figure 4:
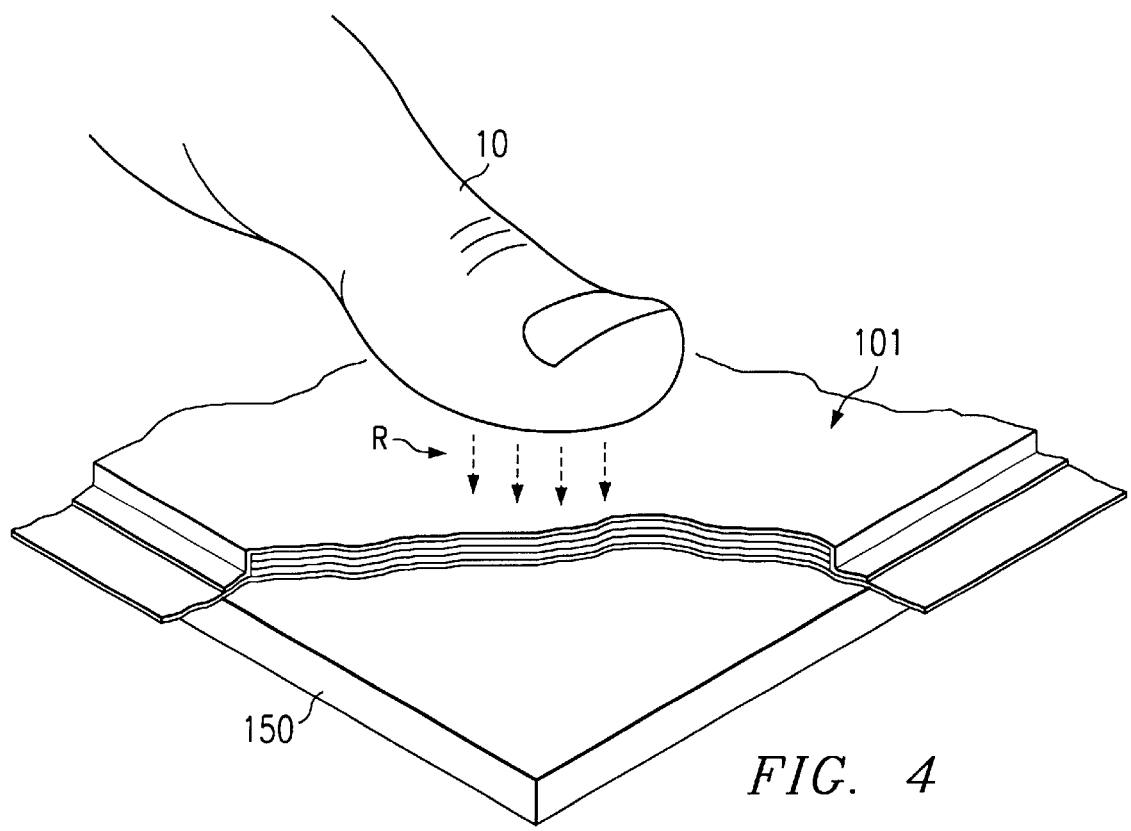
FIG. 4 depicts the invention in operation.

FIG. 4 illustrates the irradiated image R of the invention described by thumb print contact of thumb 10 on contact surface 101. In FIG. 4, image R is passing through to photosensitive array 150 as described above with reference to FIG. 1.

Figure 5A:
FIGS. 5A and 5B are actual thumb print images obtained using the preferred embodiment.
Figure 5B:

FIGS. 5A and 5B are representations of thumb print images irradiated in accordance with the preferred embodiment as described herein, as captured by a digital camera. The high degree of fidelity and resolution will be appreciated.

With reference to the preferred embodiment, application-specific adjustment of layer thickness of the electroluminescent system may be necessary, in combination with corresponding adjustment of power source parameters and dopant concentrations, in order to maximize fidelity, contrast and resolution. For example, in the thumb print generator described herein using an electroluminescent system detailed in above-referenced U.S. application "ELECTROLUMINESCENT SYSTEM IN MONOLITHIC STRUCTURE," power source 110 on FIG. 1 should generate at least 20 volts AC at approximately 1.5 kHz. Note, however, that a voltage in excess of 50 volts AC may generate an electrical sensation to an adult human user, albeit harmless at the levels of current generated by the apparatus. Power source requirements will also vary with the physical size of the irradiated image expected to described by contact. For example, in the arrangement described above, experimentation has shown 20 volts AC at 1.5 kHz generates a satisfactory image for a human fingerprint or thumb print, while 30 volts AC at 2 kHz is needed for a satisfactory palm print image.

Note that from an applications standpoint, integrated circuit chip-based inverter modules convert low direct current voltages (3 volts to 5 volts) to the suggested alternating current voltages and frequencies described. The low currents generated by these modules are ideal for PTF electroluminescent systems and are very safe for human use.

Although the present invention and its advantages have been described in detail, it should be understood that various changes, substitutions and alterations can be made herein without departing from the spirit and scope of the invention as defined by the appended claims.

We claim:

1. A method for generating an image described by contact, comprising:
    (a) providing a laminate, the laminate comprising at least one polymer thick film layer and including at least an outer receiving surface, a luminescent layer, and a translucent electrode layer, the receiving surface on the laminate separated from the translucent electrode layer by the luminescent layer;
    (b) coupling a power source to the translucent electrode layer and to a remote contact surface;
    (c) touching the receiving surface with the contact surface, wherein said touching is effective to selectively generate electric current through the laminate between the contact surface and the translucent electrode layer in a pattern in register with zones of contact between the contact surface and the receiving surface; and
    (d) responsive to said selective current generation, energizing the luminescent layer so as to generate light in said pattern.

2. The method of claim 1, in which the laminate comprises at least one neighboring pair of polymer thick film layers.

3. The method of claim 2, in which at least one of the neighboring pairs of polymer thick film layers comprises a common carrier material.

4. The method of claim 1, in which the laminate is a polymer thick film laminate.

5. The method of claim 4, in which the polymer thick film laminate comprises a common carrier material.

6. The method of claim 1, in which the translucent electrode layer comprises a polymer thick film layer doped with a conductive translucent dopant.

7. The method of claim 6, in which the conductive translucent dopant is selected from the group consisting of indium-tin-oxide and tantalum-oxide.

8. The method of claim 1, further comprising:
    (e) directing the light onto a light-sensitive array, the array configured to generate a signal representative of said pattern.

9. The method of claim 1, in which the laminate further includes a dielectric layer interposed between the receiving surface and the translucent electrode layer.

10. The method of claim 1, in which the contact surface is topographically uneven.

11. A touch-enabled image generator, comprising:
    an electroluminescent device including at least one neighboring pair of polymer thick film layers, the device having an outer receiving surface, the device including at least a luminescent layer and a translucent electrode layer, the device further disposed so that the receiving surface is separated from the translucent electrode layer by the luminescent layer; and
    an electrical power supply, one side of the power supply connected to the translucent electrode layer, the other side of the power supply disposed to be connectable to a source contact surface;
    wherein the source contact surface, when connected to the power supply and concurrently brought into contact with the receiving surface, causes electric current to flow through the luminescent layer in a pattern described by zones of electrical communication between the source contact surface and the receiving surface.

12. The invention of claim 11, in which the device further comprises a dielectric layer interposed between the receiving surface and the translucent electrode layer.

13. The invention of claim 11, in which at least one of the neighboring pairs of polymer thick film layers comprises a common carrier material.

14. The invention of claim 11, in which the translucent electrode layer comprises a polymer thick film layer doped with a conductive translucent dopant.

15. The invention of claim 14, in which the conductive translucent dopant is selected from the group consisting of indium-tin-oxide and tantalum-oxide.

16. The invention of claim 11, in which the source contact surface is topographically uneven.

17. The invention of claim 11, in which the source contact surface is skin.

18. The invention of claim 11, further comprising a light-sensitive array, the array configured to generate a signal representative of said pattern when luminescence from the device is directed onto said array.

19. A touch-enabled image generator, comprising:

an electroluminescent laminate of polymer thick film layers, the laminate comprising a common carrier material, the laminate having an outer receiving surface, the laminate including at least a dielectric layer, a luminescent layer and a translucent electrode layer, the laminate further disposed so that the receiving surface is separated from the translucent electrode layer by the luminescent layer and the dielectric layer; and an electrical power supply, one side of the power supply connected to the translucent electrode layer, the other side of the power supply disposed to be connectable to a source contact surface;

wherein the source contact surface, when connected to the power supply and concurrently brought into contact with the receiving surface, causes electric current to flow through the luminescent layer in a pattern described by zones of electrical communication between the source contact surface and the receiving surface.

20. The invention of claim 19, further comprising a light-sensitive array, the array configured to generate a signal representative of said pattern when luminescence from the laminate is directed onto said array.

* * * * *